United States Patent [19]

Nakagawa

[11] Patent Number: 4,545,839
[45] Date of Patent: Oct. 8, 1985

[54] DUST-PROOF REINFORCING SHEET MATERIAL TO BE APPLIED OVER HANDLING OPENING FORMED ON WALL OF BOX

[75] Inventor: Yasuyuki Nakagawa, Hirakata, Japan

[73] Assignee: Asahi Kakoshi Co., Ltd., Osaka, Japan

[21] Appl. No.: 663,885

[22] Filed: Oct. 23, 1984

Related U.S. Application Data

[62] Division of Ser. No. 536,936, Sep. 28, 1983.

[51] Int. Cl.$^4$ .................. B32B 31/10; B32B 31/12; B32B 31/30
[52] U.S. Cl. .................. 156/244.11; 156/244.17; 156/244.18; 156/244.19; 156/244.22; 156/244.23; 156/244.24; 156/250; 156/252; 156/263; 156/265; 156/278; 156/305; 156/308.4; 156/308.8
[58] Field of Search ............ 156/244.11, 244.17, 156/244.18, 244.19, 244.22, 244.23, 244.24, 250, 252, 263, 265, 278, 305, 308.4, 308.8

[56] References Cited

U.S. PATENT DOCUMENTS 2,820,733  1/1978  Sorel .................. 428/138

FOREIGN PATENT DOCUMENTS 2312919  9/1974  Fed. Rep. of Germany ...... 428/138

Primary Examiner—James C. Cannon
Attorney, Agent, or Firm—Jordan and Hamburg

[57] ABSTRACT

According to the invention a dust-proof reinforcing sheet material is provided. The sheet material is applied over and around a handling opening of a box. The sheet material comprises a base sheet having through-holes punched out, an adhesive layer applied on one side of the base sheet and an elastic film applied on the other side of the base sheet. The elastic film is stretchable five times as the original size and is transparent or translucent to allow light rays to transmit therethrough. The light rays passed through the elastic film and the throughhole is sensed by photo-sensor to cut the sheet material at a pre-set position.

8 Claims, 7 Drawing Figures

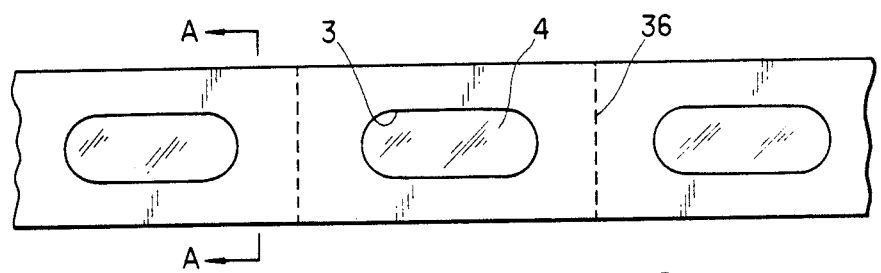
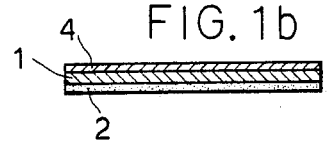
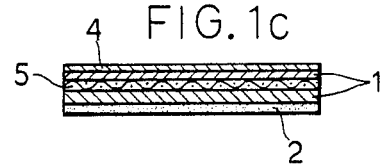
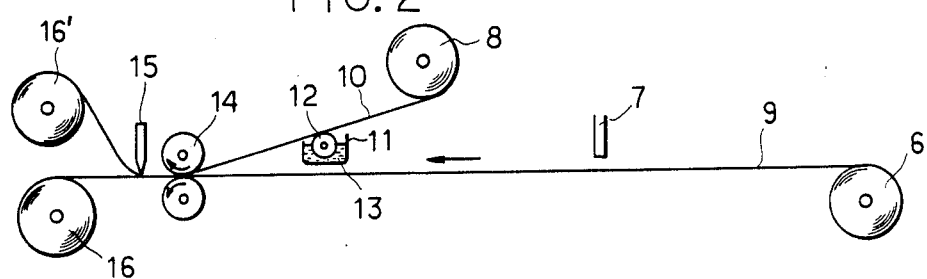
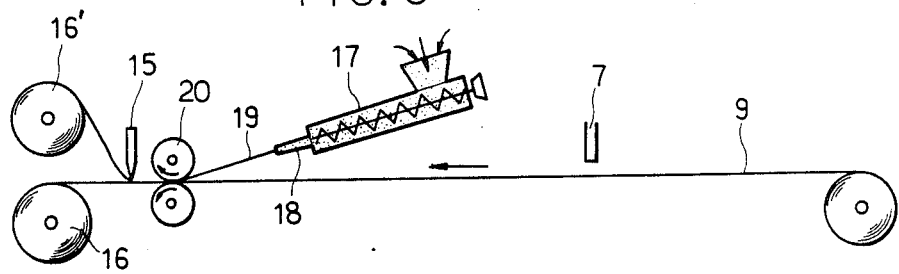
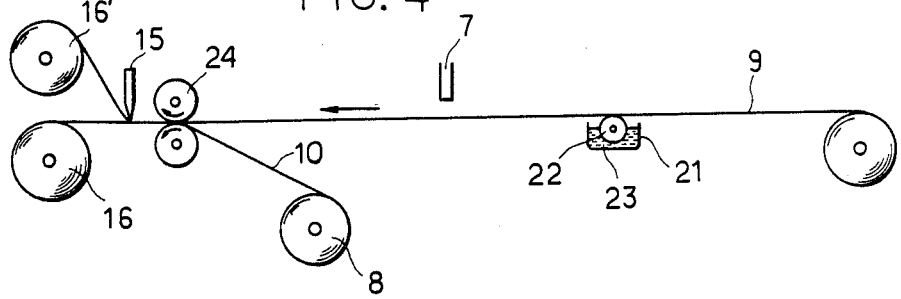

DUST-PROOF REINFORCING SHEET MATERIAL TO BE APPLIED OVER HANDLING OPENING FORMED ON WALL OF BOX

This is a division of application Ser. No. 536,936, filed Sept. 28, 1983.

BACKGROUND OF THE INVENTION

1. Field of the Invention

The present invention relates to a dust-proof reinforcing sheet material to be applied over and around a handling opening of a box, typically made of a paper board or corrugated board, the process for preparing the same and the process for the application thereof on the wall of the box. More particularly, the invention is directed to a composite web comprising a base sheet having a row of through-holes punched out to be arranged equi-distant apart, and a highly elastic and light-transmissible film extending over the said through-holes.

2. Prior Art

A box made of corrugated paper widely used to contain goods therein for storage and transportation purposes is provided with access or handling openings at both side walls thereof for allowing four fingers of the handler to be inserted therethrough so that the handler may firmly grasp the side walls by hands. However, if the content in the box is one of the precision parts of an electronic machine, foodstuff or medicines, etc., there arises a risk that dusts or vermin, such as insects or rat, might get into the box through the openings. In order to exclude the invasion of dusts or vermin and to obviate deterioration of the goods or hygienic problems caused thereby, a small box made of corrugated paper without openings had to be used by now. However, the use of small container box leads to the need of a larger number of boxes for the package of a given volume of the content to be packed therein. This inevitably results in larger consumption of the material for the container boxes.

To solve the problems caused by the provision of through-opening, it has hitherto been proposed to use a reinforcing sheet having a center hole for receiving the fingers of the handler theretrough and an inwardly-projecting bag having the periphery adhering around the center hole in a dust-proof fashion. However, the container box provided with the inwardly-projecting dust-proof bag according to this prior-made proposal has disadvantages that dusts tend to accumulate in the bag to make the fingers of the handler dirty, that the projecting bag hinders the put-in and put-out operations of the content, and that the bag is apt to be broken by the finger nails of the handler or the edges or corner of the content resulting in serious contamination problem since the bag is made of a non-elastic material.

Another disadvantage of the prior-made proposal described above is that the reinforcing sheet having the center hole and the inwardly-projecting bag attached around the periphery of the center hole must be prepared through a cumbersome and labor-consuming manner and the thus prepared reinforcing sheet must be applied around each opening of the container box by hand, because no automatic and continuous process has been developed by now, resulting in increase in production cost.

OBJECTS AND SUMMARY OF THE INVENTION

An object of the invention is to provide a dust-proof reinforcing sheet material to be applied around and over an opening of a container box to eliminate the fear that dusts or vermin get into the box and to reinforce the opening for easy handling of the box.

Another object of the invention is to provide a dust-proof reinforcing sheet material and a process for preparing the same, the reinforcing sheet material having a through-hole covered by a substantially flat film which may be stretched to permit easy insertion of the fingers of a handler when he or she desires to handle the box.

A further object of this invention is to provide a dust-proof reinforcing sheet material and a process for preparing the same, the reinforcing sheet material having a through-hole covered by a substantially flat and highly elastic film which prevents the content in the box from being contaminated with dust or any foreign matters and yet may be held in a condition not to hinder the put-in and put-out operations of the content.

A still further object of the invention is to provide a process for the preparation of a dust-proof reinforcing sheet material continuously and efficiently through continuous processing steps.

Yet a further object of the invention is to provide a process for separating individual dust-proof reinforcing sheet material pieces from a composite web one by one and then applying the thus separated sheet material pieces around and over the corresponding openings of container boxes automatically and continuously without the need of manual operation.

In view of the aforementioned objects, the present invention provides a composite web comprising a base sheet having a row of through-holes punched out to be arranged equi-distant apart, an adhesive layer applied on one side of said base sheet, and an elastic film applied on the other side of said base sheet to extend over said through-holes, said elastic film being stretchable to have an area of five times or more of the original surface area thereof, and said elastic film being transparent or translucent to allow light rays to transmit therethrough so that the position of the web may be sensed by photosensor means throughout the subsequent processing steps.

Additionally, the present invention provides a process for the preparation of a composite web comprising the steps of: drawing a base sheet applied with an adhesive layer on one side thereof from a reel followed by punching out through-holes successively to form a row of through-holes equi-distant apart along the entire length of said base sheet; applying an elastic film over the other side of said base sheet, said elastic film being stretchable to have an area of five times or more of the original surface area thereof and being transparent or translucent to allow light rays to transmit therethrough so that the position of the web may be sensed by photosensor means throughout the subsequent processing steps; and taking up the finished composite web around a take-up reel.

A further process provided by the present invention is a process for applying a dust-proof reinforcing sheet material over and around an opening provided through a wall of a box for handling purpose, said dust-proof reinforcing sheet material having a through-hole substantially co-extensive with said opening provided through the wall of the box and covered by an elastic film which is stretchcable to have an area of five times or more of the original surface area thereof, and said dust-proof reinforcing sheet material being separated one by one from a composite web having a row of said through-holes covered by said elastic film, comprising the steps of: pulling said web out of a reel continuously; irradiating a light ray along the length of said web to allow the light ray to transmit through said elastic film to a photo-sensor thereby to sense the position of the moving web to cut the same at a precise position; and applying the thus separated sheet material over and around said opening in position where said through-hole of said dust-proof reinforcing sheet material is put coextensive with said opening provided through the wall of the box.

BRIEF DESCRIPTION OF THE DRAWINGS

The present invention will be more readily understood from the following detailed description of presently preferred embodiments with reference to the appended drawings, in which:

FIG. 1a is a plan view showing a fragment of one embodiment of a dust-proof reinforcing web according to the invention;

FIG. 1b is an enlarged cross section taken along line A—A of FIG. 1a;

FIG. 1c is a section similar to FIG. 1b but showing another embodiment of the invention;

FIGS. 2 to 4 are schematic illustrations showing a process for the preparation of the composite web of the invention.

Figure 5:
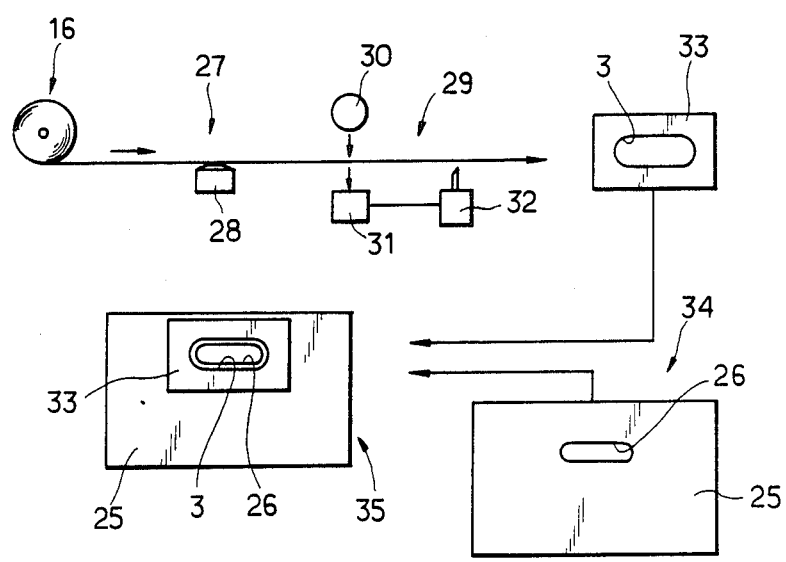
FIG. 5 is a schematic illustration showing a process for applying dust-proof reinforcing sheet material according to the invention on a wall of corrugated paper box.

PREFERRED EMBODIMENTS OF THE INVENTION:

Preferred embodiments of the invention will be described with reference to the drawings.

Firstly referring to FIGS. 1a to 1c, a base sheet 1 is thick kraft paper having one side applied with an adhesive layer 2. Through-holes 3 are punched out at pre-set intervals and serve as the passages through which light rays transmit to a photo-tube. On the other side opposite to the side on which the adhesive layer 2 is applied, laminated is a film 4 which is elastic and stretchable to have an area of five times or more of the original surface area, for example polyurethane film or natural or synthetic rubber base films prepared by processing latexes. The elastic film 4 extends over the through-holes 3. A pressure-sensitive trackifier, such as a synthetic or natural rubber base tackifier or an acrylate base tackifier, may be used as the material for the adhesive layer 2, when the box to which the composite sheet or laminate of the invention is applied is made of a plastics material. However, if the composite sheet or laminate of the invention is intended to be applied to a box made of corrugated paper, the adhesive layer 2 is preferably made of a re-wettable adhesive. Preferable examples of re-wettable adhesive include acrylate base adhesives, polyvinyl acetate base adhesives, glue, gum arabi, dextrin, mixtures of dextrin with acrylate base adhesives or polyvinyl acetate base adhesives. When a pressure-sensitive tackifier is used, a releasing paper is applied over the adhesive layer 2. The elastic film 4 should be transparent or translucent to allow light rays to transmit therethrough to a photo-tube in the subsequent processing steps as will be described in detail hereinafter. The thickness of the elastic film 4 should be preferably in the range of from 20 to 150 microns, more preferably from 30 to 60 microns. If the film 4 is too thick, strong pressing power must be applied on the film when a handler desires to insert his fingers through the opening of the box. The film becomes too weak if it is so thin as less than 20 microns. In another embodiment shown in FIG. 1c, a net 5 made of a synthetic fiber, such as a woven or knitted net made of elongated yarns of polypropylene, is sandwitched between the thick paper layers 1 to increase the strength of the composite sheet.

The process for the preparation of the composite web including a number of dust-proof reinforcing sheet material pieces of the invention will now be described. Referring to FIG. 2, reference numeral 6 designates a roll having a width of 88 cm and containing 60 m of thin craft paper having one side applied with an adhesive layer 2. The laminated sheet 9 composed of the thick craft paper 1 and the adhesive layer 2 is drawn from the roll 6 and passed to a Tomson punching machine 7 where substantially ellipsoidal through-holes 3 having dimensions of 86 mm×36 mm for accommodating four fingers of a handler are punched out. In the illustrated example, 10 through-holes are juxtaposed in the width direction and punched out simultaneously, and ten rows of through-holes are successively punched out so that each row has through-holes arranged equi-distant apart. Each of the through-holes is positioned substantially coextensive with the opening of the corrugated paper box when the composite sheet material of the invention is applied to the box, and it serves also as a passage window through which light rays can transmit to a photo-tube at the subsequent processing steps. Separately, an elastic film 10 is taken out of another roll 8 and applied with an adhesive 13, for example an EVA base adhesive, by means of a coating roller 12 (which may be replaced by a brush type coater) partly dipped in an adhesive container 11. As shown, the laminated sheet 9, after being subjected to the punching step to be formed with a plurality of through-holes 3, is laminated with the elastic film 10 and pressed between the press rollers 14 to form a composite web with the through-holes 3 covered by the elastic film 10. Then, the web is cut along the longitudinal direction thereof by a slitter 15 so that ten separated webs each having a width of 88 mm are prepared and wound around take-up rollers 16, 16'. Although only two take-up rollers 16, 16' are shown in the Figure, it should be clear to those skilled in the art that ten similar take-up rollers are provided for taking up ten separated webs.

FIG. 3 shows another embodiment of the process of the invention. In this embodiment, in place of the rolled elastic film 10 used in the embodiment shown in FIG. 2, an elastic film 19 is formed just prior to the step of applying the film on the laminated sheet 9. In detail, the elastic film is extruded from an extruder 17 through a die 18 and supplied to a press roller pair 20 in the half-fused condition to be applied over the laminated sheet 9. Although additional investment costs are necessary to operate the invention in this manner, the elastic property of the film 19 may be conveniently utilized in the preparation step.

FIG. 4 shows a further embodiment of the process of the invention, wherein the laminated sheet 9 having its upside applied with an adhesive is drawn from a roll and applied on its downside with a hot-melt type adhesive 23, for example an EVA base adhesive, by means of a coating roller 22 (which may be replaced by a brush type coater) partly dipped in a container 21 containing a molten adhesive melted by a heater (not shown). After being subjected to the punching step, the sheet 9 is joined with an elastic film 10 paid from a roll 8 and pressed between hot rollers 24 where the hot melt type adhesive 23 is melted so that the elastic film 10 adheres firmly over the sheet 9. Then, the composite web is separated by a slitter 15 to form a plurality of webs of dust-proof reinforcing sheet.

Referring now to FIG. 5, continuous operations for applying the dust-proof reinforcing sheet material around and over an opening provided on a wall of corrugated paper box will be described. In FIG. 5, reference numeral 16 designates a composite web prepared in accordance with the invention to be separated into a plurality of dust-proof reinforcing sheet material pieces 33. Reference numeral 25 designates schematically a wall of the corrugated paper box provided with an opening 26.

According to a characteristic feature of the invention, the dust-proof reinforcing sheet material 16 is supplied in the form of a composite web having a row of through-holes 3 which allow passage of light rays to serve means for positioning the web for the application steps. The composite web 16 is drawn from the roll and water is coated over the re-wettable adhesive layer, and irradiated by light rays which transmit through the through-holes 3 to reach a photo-sensor which, in turn, actuates a cutter 32 to cut the web at the positions intermediate of the through-holes. The thus separated sheet material pieces are applied around and over the openings 26 of the corrugated paper boxes delivered successively, with the through-holes 3 positioned substantially coextensive with the openings 16 of the boxes.

In FIG. 5, successive steps of applying the dust-proof reinforcing sheet material separated from the composite web 16 on the wall of the corrugated paper box are shown, diagrammatically. At the first step, the composite web 16 is drawn from a roll. Then, the web is passed through a station 27 where it contacts with a sponge or brush containing water so that the adhesive layer becomes wet to be ready for adhesion. Reference numeral 29 designates a station where light rays emit from a light source 30 and the light rays transmitting through the through-holes are sensed by a photo-tube 31 which actuates a cutter 32 with some time lag. Although the station 27 is shown as it were positioned separately from the station 29 in the Figure, these stations are very close with each other in the practical operation so that wetting operation and the cutting operation are carried out substantially concurrently, and the thus cut separate pieces 33 are successively applied on corresponding walls of corrugated paper boxes with their through-holes 3 covered by the elastic film 4 coextensive with the openings 26 of the boxes. Although not shown, the corrugated paper boxes are successively fed by proper means to the application station 34. Reference numeral 35 designates schematically the finished box applied with the dust-proof reinforcing sheet material around and over the opening provided for handling purpose. The cut lines 36 shown by dotted lines in FIG. 1a are imaginal lines along which the composite web is cut to be separated into individual pieces of reinforcing sheet material, and the positioning of the cut lines 36 may be changed and controlled as desired.

In a practical operation example, a composite web having a width of about 88 cm and a length of about 60 m is wound to form a roll of dust-proof reinforcing sheet material, and the roll is loaded on an equipment comprising a water coating device, a light source, a photo-tube and a cutter. The wetting operation by coating water and the cutting operation by the actuation of the cutter are carried out substantially concurrently, and the separated reinforcing sheet pieces are applied on the walls of corrugated paper box around and over the openings. By employing the successive application process described above, number of operaters may be decreased by at least 2 so that the entire operation may be carried out by a few operators. Moreover, the use of the composite web of reinforcing sheet material according to this invention and the use of re-wettable adhesive enable continuous operations actually without any loss time otherwise necessary in the conventional process.

If the box is made of plastic material rather than corrugated paper, a pressure-sensitive adhesive is used in place of the re-wettable adhesive and the station 27 for wetting the adhesive may be omitted.

Although the present invention has been described with reference to the preferred embodiments, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:

1. A process for the preparation of a dust-proof reinforcing sheet material to be applied over and around an opening provided through a wall of a box for handling the box, the process comprising the steps of:
   (a) drawing a base sheet applied with an adhesive layer on one side thereof from a reel followed by punching out through-holes successively to form a row of through-holes equi-distant apart along the entire length of said base sheet;
   (b) applying an elastic film over the other side of said base sheet, said elastic film being stretchable to have an area of five times or more of the original surface area thereof and being transparent or translucent to allow light rays to transmit therethrough so that the position of the sheet material is sensed by photo-sensor means; and
   (c) taking up the finished sheet material around a take-up reel.

2. The process according to claim 1, wherein a plurality of rows of through-holes are punched out at said step (a) and wherein said base sheet applied with said elastic film is separated by cutting along the longitudinal direction subsequent to said step (b) so that a plurality of separated sheet material each having a row of through-holes equi-distant apart is prepared.

3. The process according to claim 1, wherein said elastic film is applied over said other side of said base sheet at said step (b) by the use of an adhesive.

4. The process according to claim 1, wherein said elastic film is formed just prior to said step (b) by extrusion molding and applied on said base sheet by fusing under pressure.

5. A process for applying a dust-proof reinforcing sheet material over and around an opening provided through a wall of a box for handling purpose, said dust-proof reinforcing sheet material having a through-hole substantially co-extensive with said opening provided through the wall of the box and covered by an elastic film which is stretchable to have an area of five times or more of the original surface area thereof, and said dust-proof reinforcing sheet material being separated one by one from a composite web having a row of said through-holes covered by said elastic film, comprising the steps of:

(a) pulling said web out of a reel continuously;
(b) irradiating a light ray along the length of said web to allow the light ray to transmit through said elastic film to a photo-sensor thereby to sense the position of the moving web to cut the same at a precise position; and
(c) applying the thus separated sheet material over and around said opening in position where said through-hole of said dust-proof reinforcing sheet material is put coextensive with said opening provided through the wall of the box.

6. The process according to claim 5, wherein said photo-sensor is a photo-tube.

7. The process according to claim 5, wherein an adhesive is applied on the side of said composite web opposite to the side over which said elastic film is applied after said step (a).

8. The process according to claim 5, wherein said composite web is provided with a re-wettable adhesive on the side opposite to the side on which said elastic film is applied, and wherein the process further comprises a step of coating said re-wettable adhesive with water to render the adhesive sticky.

* * * * *